Oct. 31, 1944.  C. H. ENDRESS ET AL  2,361,533

STORAGE BATTERY AND GRID THEREFOR

Filed Oct. 11, 1943

INVENTOR.
CLARENCE H. ENDRESS
BY LEO E. PUCHER

Kwis Hudson Boughton & Williams
ATTORNEYS

Patented Oct. 31, 1944

2,361,533

UNITED STATES PATENT OFFICE 2,361,533

STORAGE BATTERY AND GRID THEREFOR

Clarence H. Endress, Cleveland Heights, and Leo E. Pucher, South Euclid, Ohio, assignors to Willard Storge Battery Company, Cleveland, Ohio, a corporation of West Virginia Application October 11, 1943, Serial No. 505,766

2 Claims. (Cl. 136—13)

This invention relates to a storage battery of the type in which the positive and negative plates and the necessary insulation are rolled up into spiral form to produce what is commonly known as a "jelly roll" battery. These batteries are generally of small size although their size is not of importance.

The principal object of the invention is to provide grids which are so formed that the likelihood of displacement of the biscuits of active material during the rolling up operation is minimized. It has been found that with plates of spiral electrode batteries as heretofore formed there has been a tendency for the plates to kink during the rolling up operation, with the result that the active material was displaced from the grids. This objection or disadvantage is entirely overcome by the present invention.

In the accompanying sheet of drawings illustrating our invention,

Figure 1:
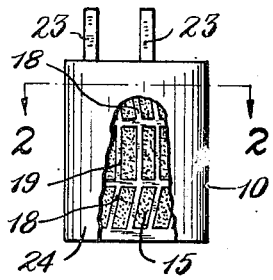
Fig. 1 is a side elevation of a spiral electrode battery formed in accordance with the present invention, the outer layer of insulation being partly broken away.
Figure 2:
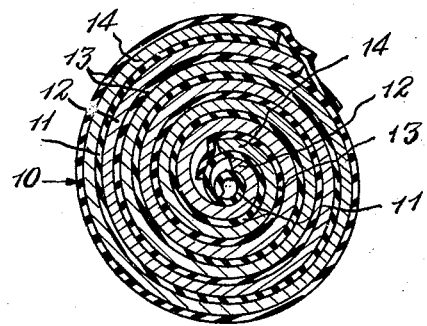
Fig. 2 is an enlarged transverse sectional view of the same substantially along the line 2—2 of Fig. 1.

Our improved spiral electrode battery is shown at 10. Fig. 1 shows the battery in elevation and Fig. 2 shows it in section on an enlarged scale, and it will be seen particularly from the latter view that it is composed of an inner sheet or strip 11 of insulating material, a positive plate 12, a second sheet or strip 13 of insulating material, and a negative plate 14, all rolled up tightly to form my improved spiral electrode battery. In Fig. 1 the active material is designated 15.

The grids for the plates 12 and 14 are initially in flat form. Each grid is composed of an outer frame 16 with one or more longitudinally extending bars 17. In the preferred form of the invention, two spaced longitudinal bars 17 are employed having two rows of ribs 18 extending between the longitudinal sides of the frame and the adjacent longitudinal bars, these ribs 18, in accordance with an important part of the invention, being inclined with respect to the longitudinal axis of the grid. Between the bars 17 we provide ribs 19 which are at right angles to the bars 17. The purpose of inclining part or all of the ribs will be explained presently.

Figure 3:
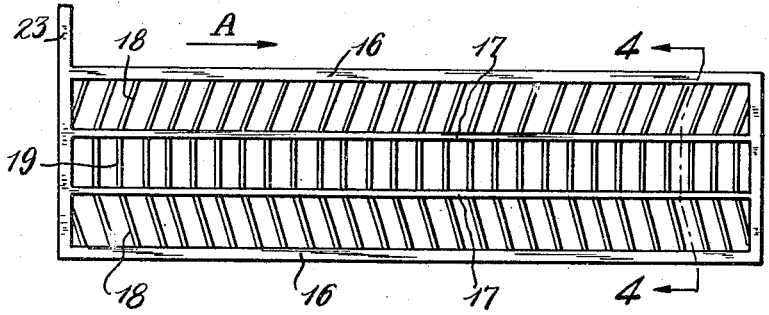
Fig. 3 is a plan view of a grid which is adapted to be employed for the plates of our improved spiral electrode battery.
Figure 5:
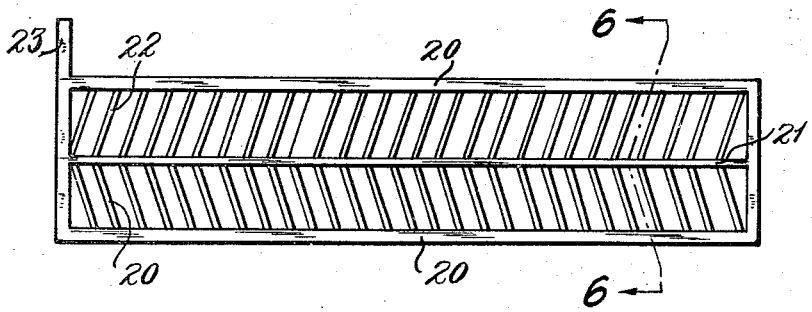
Fig. 5 is a plan view of a modified form of grid.

In the modification shown in Fig. 5, the grid has an outside frame 20, a single centrally disposed longitudinally extending bar 21 and two sets of diagonally disposed ribs 22 which extend between the longitudinal side members of the frame and the center bar 21. This last mentioned grid is employed for batteries of slightly less height than the battery shown in Fig. 1 utilizing the grid shown in Fig. 3. In each instance the inclined ribs on one side of the frame are opositely inclined with respect to the inclined ribs on the opposite side.

For batteries of still larger size, there will be employed grids wherein there will be more longitudinally extending bars 17 and additional alternate rows of inclined ribs 18 and straight ribs 19 at right angles to the longitudinal bars arranged between the longitudinally extending ribs. Or the arrangement shown in Fig. 5 may be utilized in forming the larger grids by adding more of the longitudinally extending bars and more of the sets of inclined ribs. In other words, the arrangement shown in Fig. 3 or Fig. 5 will be multiplied to an extent depending upon the height or size of the battery intended to be produced.

Figure 4:
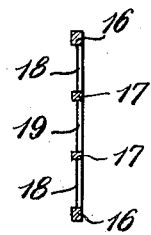
Fig. 4 is a transverse sectional view of the same substantially along the line 4—4 of Fig. 3.
Figure 6:
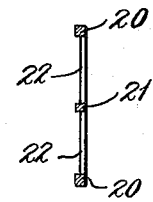
Fig. 6 is a transverse sectional view of the modified grid of Fig. 5, the section being taken substantially along the line 6—6 of Fig. 5.

Another important feature of the invention resides in the thickness of the ribs 18, 19, and 22 relative to the thickness of the frame and the longitudinal bars 17 and 21 and the arrangement of the former with respect to the latter. It will be noted that the ribs 18, 19, and 22 are of less thickness than the sides and ends of the outside frame and the longitudinally extending bar or bars (see Figs. 4 and 6). It will be noted also that the grid viewed from one side is flat, i. e., the ribs 18, 19, and 22 are in the same plane with the frame and with the longitudinally extending bars 17 and 21, the ribs 18, 19, and 22 extending upwardly from the flat side to a lesser height than the remaining portions of the grid. The grid is adapted to be pasted from one side only, i. e., from the uneven side, so that the paste on the uneven side is continuous between the sides and ends of the frame and the longitudinal bar or bars, while on the opposite side the paste is interrupted by the ribs 18, 19, or 22. With this construction the grids receive the required amount of paste which is located in a position adapted for rolling. The forming or charging of the plates is done while the plates are in flat form, after which the plates are rolled up with the insulation to form the spiral electrode battery.

The negative plate is made somewhat longer than the positive plate inasmuch as the positive plate is on the inner side of the negative plate in the rolled up battery. In forming the grids, each is provided with a terminal 23, the terminal on the positive plate being on the opposite end of the grid from the terminal on the negative plate.

In preparing to roll the plates, a strip of insulating material is placed on a suitable support, the negative plate is placed on the insulating material with what was formerly the uneven side upward, a second strip of insulating material is applied, and then the positive plate is placed on the second strip of insulating material with the same side of the plate upward. In rolling up the plates and strips of insulating material, the rolling is done in the direction of the sloping cross ribs of both the positive and negative plates, the terminal 23 of one plate being at the center of the assembly and the terminal of the other plate being at the outer side. In other words, preparatory to the rolling operation the positive plate will overlie the negative plate with the ribs of the grids 18 or 22 of both plates extending in the same direction but with the terminal of the positive plate arranged at the opposite end from the terminal of the negative plate, and then the plates and insulation are rolled up tightly in the direction of the arrow A in Fig. 3, and the active material of the plates is held toward the inside of the roll.

For the insulating material we may use any suitable material such as glass wool, redwood bark insulation formed in accordance with Fairclough Patent No. 2,314,203, granted March 16, 1943, or other suitable flexible insulation.

The angular relationship between the ribs 18 or the ribs 22 and the longitudinally extending bars avoids kinks when the plates are rolled up. With this construction the plates roll more evenly in that the pressure resulting from the rolling distributes itself across the plates, thus aiding in retaining the biscuits of active material in the grid frame. Making the grid flat on one side and having the ribs of less height than the frame and longitudinally extending bars on the other side assist in preventing loosening of the active material since the active material is held toward the inside of the roll. Thus when the plates and separator material are rolled up, the biscuits of active material are retained in the grids, and the objects of the invention are very effectively attained.

The battery herein disclosed is adapted to be placed in any suitable container 24 formed of insulating material. The battery is adapted for use generally where small batteries are employed, as, for example, in flashlights, lanterns, etc.

While we have described the preferred embodiments of our invention, we do not wish to be confined to the precise details illustrated and described but aim in our claims to cover all modifications which do not involve a departure from the spirit and the scope of the invention.

Having thus described our invention, we claim:

1. A spiral electrode battery comprising plates superposed with intervening insulation and simultaneously rolled up into spiral form, each plate being composed of a pasted grid, said grid comprising a frame and one or more longitudinally extending bars, and ribs arranged between and extending diagonally with respect to the side members of the frame and the bar or bars, the ribs on one side of the frame being oppositely inclined with respect to the ribs on the other side of the frame.

2. A spiral electrode battery comprising plates superposed with intervening insulation and simultaneously rolled up into spiral form, each plate being composed of a pasted grid, said grid comprising a frame and one or more longitudinally extending bars, and ribs arranged between and extending diagonally with respect to the side members of the frame and the bars, the ribs on one side of the frame being oppositely inclined with respect to the ribs on the other side of the frame, the plates and insulation being rolled up longitudinally with the plates arranged so that the direction of rolling will be in the direction of declination of the ribs of the grids.

CLARENCE H. ENDRESS.
LEO E. PUCHER.